United States Patent
Hashimoto et al.

(10) Patent No.: US 9,932,006 B2
(45) Date of Patent: Apr. 3, 2018

(54) VEHICULAR ENERGY ABSORPTION STRUCTURE

(71) Applicant: TOYOTA JIDOSHA KABUSHIKI KAISHA, Toyota-shi, Aichi-ken (JP)

(72) Inventors: Hiroki Hashimoto, Nisshin (JP); Toshihiro Goto, Toyota (JP); Shintaro Kitakata, Nisshin (JP); Shigenori Hashida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/221,954

(22) Filed: Jul. 28, 2016

(65) Prior Publication Data

US 2017/0088075 A1 Mar. 30, 2017

(30) Foreign Application Priority Data

Sep. 25, 2015 (JP) ................. 2015-188563

(51) Int. Cl.
*B60R 19/34* (2006.01)
*F16F 7/12* (2006.01)
*F16F 7/00* (2006.01)

(52) U.S. Cl.
CPC ............. *B60R 19/34* (2013.01); *F16F 7/00* (2013.01); *F16F 7/12* (2013.01)

(58) Field of Classification Search
CPC ..... B60R 19/24–19/36; F16F 7/00; F16F 7/12
See application file for complete search history.

(56) References Cited

U.S. PATENT DOCUMENTS

| | | | |
|---|---|---|---|
| 4,413,856 A * | 11/1983 | McMahan | B60R 19/26 293/110 |
| 5,074,391 A | 12/1991 | Rosenzweig | |
| 8,100,237 B2 | 1/2012 | Beika et al. | |
| 8,256,831 B2 * | 9/2012 | Abe | B60R 19/34 296/133 |
| 8,261,672 B2 | 9/2012 | Heinisch et al. | |
| 8,893,866 B2 | 11/2014 | Lim | |
| 9,598,033 B1 * | 3/2017 | Berger | B60R 19/03 |

(Continued)

FOREIGN PATENT DOCUMENTS

| | | |
|---|---|---|
| JP | H07-145841 A | 6/1995 |
| JP | H08-121519 A | 5/1996 |

(Continued)

*Primary Examiner* — Vishal R Sahni
(74) *Attorney, Agent, or Firm* — Oliff PLC

(57) ABSTRACT

A vehicular energy absorption structure includes a hollow tubular energy absorption body made from a fiber reinforced resin, an opposing face (e.g., an attachment plate) that is provided facing an axial direction end portion of the energy absorption body, and against which the energy absorption body is crushed from the axial direction end portion during a vehicle collision, and a guide section (e.g., peripheral wall, ribs) that projects from the opposing face and that is disposed in an interior of the energy absorption body. The guide section includes an abutting section (e.g., abutting walls) that contacts a wall of the energy absorption body from the inner side of the wall during the vehicle collision, the abutting section being separated from the opposing face by an opening in the axial direction of the energy absorption body.

2 Claims, 7 Drawing Sheets

(56) References Cited

U.S. PATENT DOCUMENTS

| | | | |
|---|---|---|---|
| 2008/0041268 A1* | 2/2008 | Seitzberger | B60R 19/34 105/392.5 |
| 2011/0089707 A1* | 4/2011 | Perarnau Ramos | B60R 19/34 293/132 |
| 2011/0187135 A1* | 8/2011 | Kano | B60R 19/34 293/133 |
| 2014/0379223 A1 | 12/2014 | Wolkenstein et al. | |
| 2015/0151699 A1* | 6/2015 | Kaneko | B60R 19/34 293/133 |
| 2017/0057440 A1* | 3/2017 | Kitakata | B60R 19/30 |

FOREIGN PATENT DOCUMENTS

| | | |
|---|---|---|
| JP | 2005-233263 A | 9/2005 |
| JP | 2008-024084 A | 2/2008 |
| JP | 2015-196463 A | 11/2015 |
| WO | 94/07051 A1 | 3/1994 |

* cited by examiner

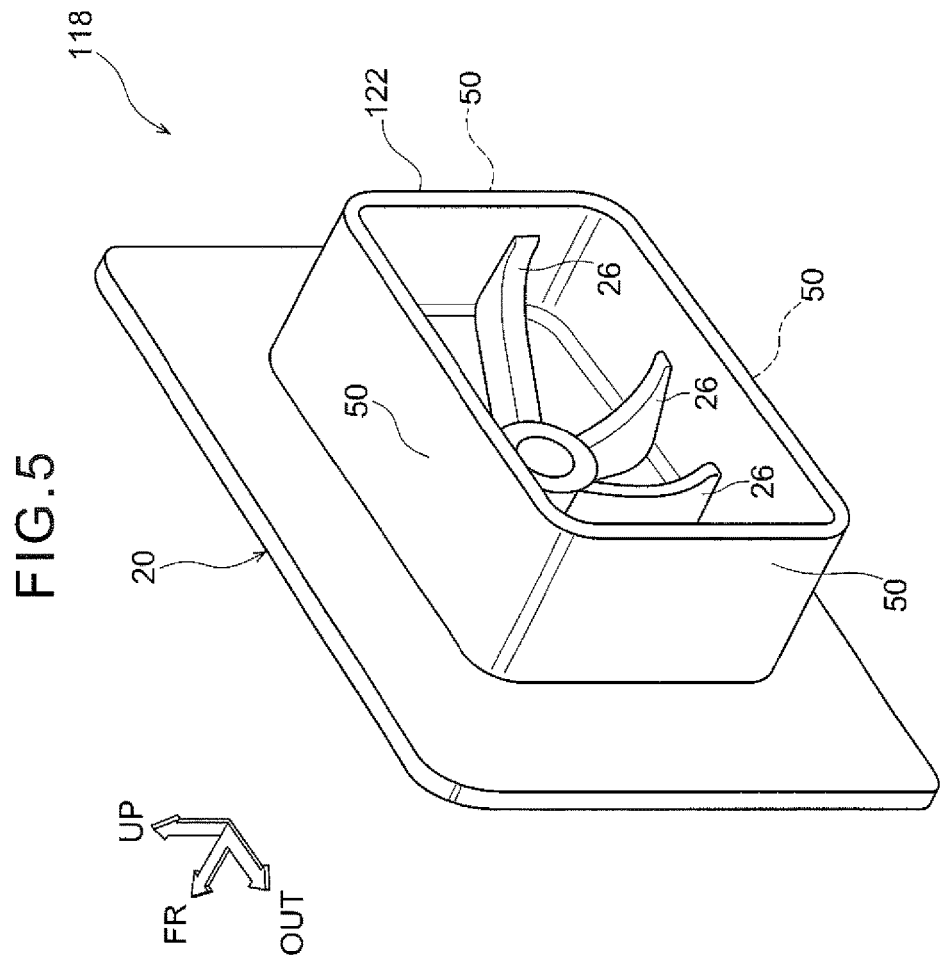

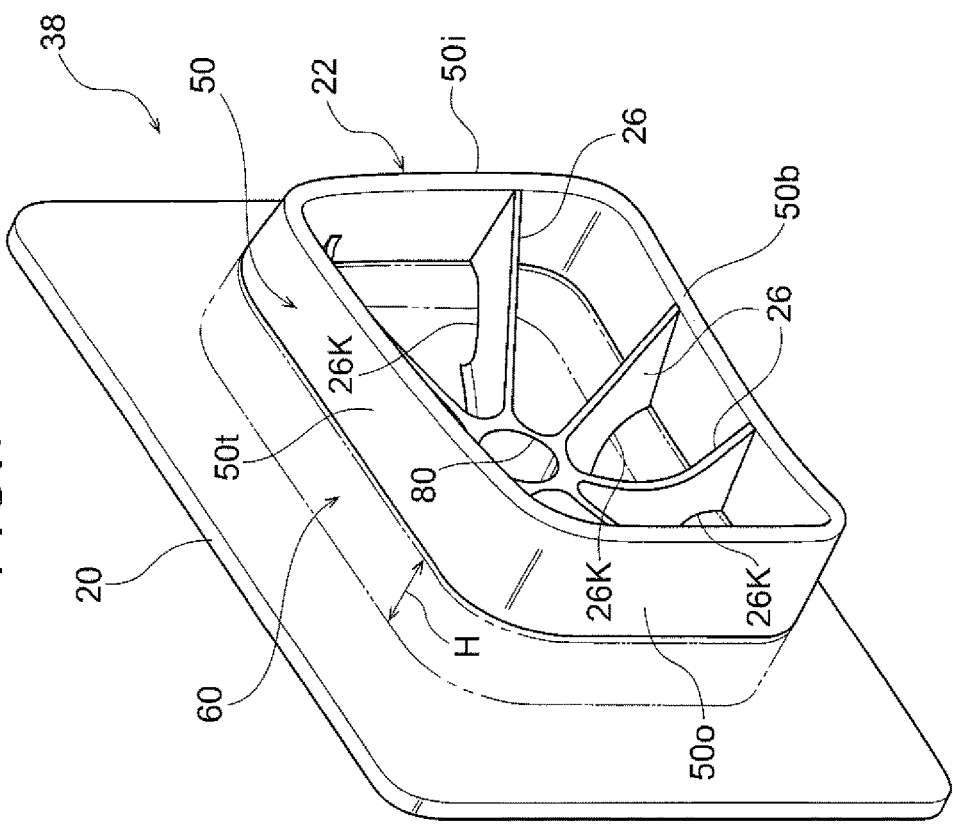
FIG.7
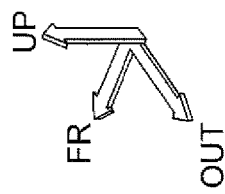

VEHICULAR ENERGY ABSORPTION STRUCTURE

CROSS-REFERENCE TO RELATED APPLICATION

This application is based upon and claims the benefit of priority of the prior Japanese Patent Application No. 2015-188563, filed on Sep. 25, 2015, the entire contents of which are incorporated herein by reference.

FIELD

The embodiments discussed herein are related to an energy absorption structure for a vehicle.

BACKGROUND

JP-A No. 2005-233263 describes a vehicular energy absorption structure including a tubular shaped crash box (energy absorption body) formed from fiber reinforced resin, and a pressing member (guide member) provided with a protrusion that abuts the inside of the crash box.

Positional misalignment of a crash box with respect to bumper reinforcement during a collision of a vehicle is suppressed in a structure that is, such as in the above conventional technology, provided with a projection (guide section) that abuts the inside of the crash box.

However, the portion of the crash box that is crushed (crushed portion) enters between the crash box and the guide section as the crash box is being crushed during a vehicle collision. When load from ingress of the crushed portion is born by the crash box in a direction orthogonal to the axis of the crash box, this impedes the progressive deformation of the crash box, leading to concerns regarding a reduction in the amount of energy absorption.

SUMMARY

In consideration of the above circumstances, an object of the embodiments is to obtain stable energy absorption characteristics in a vehicular energy absorption structure with a guide section provided internally to a tube shaped energy absorption body formed from fiber reinforced resin.

A vehicular energy absorption structure according to a first aspect is a vehicular energy absorption structure including a hollow tubular energy absorption body made from a fiber reinforced resin, an opposing face that is provided facing an axial direction end portion of the energy absorption body, and against which the energy absorption body is crushed from the axial direction end portion during a vehicle collision, and a guide section that projects from the opposing face and that is disposed at an interior of the energy absorption body, wherein the guide section comprises an abutting section, that contacts a wall of the energy absorption body from an inner side of the wall during the vehicle collision, the abutting section being separated from the opposing face by an opening in an axial direction of the energy absorption body.

The vehicular energy absorption structure according to the first aspect includes the hollow tubular energy absorption body made from a fiber reinforced resin, and the opposing face that is provided facing an axial direction end portion of the energy absorption body. During a vehicle collision, the energy absorption body is crushed against the opposing face from the axial direction end portion. Collision energy is absorbed thereby.

Moreover, the vehicular energy absorption structure also includes the guide section that projects from the opposing face and that is disposed at the interior of the energy absorption body. The guide section is configured including the abutting section.

The abutting section is provided so as to contact the wall of the energy absorption body from the inner side during a vehicle collision. Positional misalignment of the energy absorption body with respect to the opposing face is thereby suppressed from occurring during a vehicle collision.

The abutting section is also separated from the opposing face by the opening that extends in the axial direction of the energy absorption body. This opening is an opening (escape path) communicating the space on the side of the abutting section at the side of the wall of the energy absorption body, with the space on the side of the abutting section at the opposite side to the wall of the energy absorption body. Thus during a vehicle collision, crushed portions entering into the interior of the energy absorption body are able to escape through these openings, to the space on the side of the abutting section at the opposite side to the wall of the energy absorption body (to the center side of the energy absorption body). This thereby suppresses the crushed portions from becoming jammed between the abutting section and the portions of the wall of the energy absorption body that have not yet been crushed.

More precisely, when the energy absorption body is crushed from its axial direction end portion during a vehicle collision, crushed portions are generated in the vicinity of the opposing face, i.e. at the axial direction end portion of the energy absorption body. Thus in the vehicular energy absorption structure according to the first aspect, the abutting section is separated from the opposing face by an opening that extends in the axial direction of the energy absorption body. The opening is accordingly formed in the vicinity of the opposing face. Thus due to the crushed portions being able to pass through the opening, the crushed portions are accordingly suppressed from becoming jammed between the abutting section and the portions of the wall of the energy absorption body that have not yet been crushed. As a result, the energy absorption body is suppressed from receiving load from the crushed portions in a direction orthogonal to the axis of the energy absorption body, enabling stable energy absorption characteristics to be achieved.

A vehicular energy absorption structure according to a second aspect is the vehicular energy absorption structure according to the first aspect, wherein the abutting section is an abutting wall that is substantially parallel to the wall of the energy absorption body.

In the vehicular energy absorption structure according to the second aspect, the abutting section, which is capable of contacting the wall of the energy absorption body from the inner side during a vehicle collision, is the wall provided substantially parallel to the wall of the energy absorption body. A large load is thereby suppressed from being locally input to the wall of the energy absorption body. This thereby suppresses the energy absorption body from being broken by contact with the abutting section.

A vehicular energy absorption structure according to a third aspect is the vehicular energy absorption structure according to the second aspect, wherein the guide section is configured including a coupling portion that is disposed on an opposite side of the abutting wall from the wall of the energy absorption body, and that couples the abutting wall to the opposing face.

In the vehicular energy absorption structure according to the third aspect, the guide section is configured including the coupling portion that couples the abutting wall to the opposing face. This thereby enables the abutting wall to be supported by the coupling portion, and, as a result, facilitates forming of a larger opening between the abutting wall and the opposing face. The coupling portion is disposed on the opposite side of the abutting wall from the side of the wall of the energy absorption body. Thus the crushed portions are accordingly suppressed from becoming jammed between the coupling portion and the wall of the energy absorption body.

A vehicular energy absorption structure according to a fourth aspect is the vehicular energy absorption structure according to the second aspect, wherein the abutting wall is a peripheral wall disposed adjacent to an entire periphery of the wall of the energy absorption body, the guide section is disposed at an interior of the peripheral wall and is configured including a coupling portion that couples the peripheral wall to the opposing face, and the peripheral wall and the opposing face are separated from each other by an opening that extends around an entire periphery of the peripheral wall.

In the vehicular energy absorption structure according to the fourth aspect, the abutting wall is a peripheral wall disposed adjacent to the entire periphery of the wall configuring the energy absorption body. Thus positional misalignment between the energy absorption body and the opposing face is thereby appropriately suppressed in all directions from the vehicle up-down directions and the vehicle width directions.

Moreover, the guide section is disposed at the interior of the peripheral wall and includes the coupling portion that couples the peripheral wall to the opposing face. The peripheral wall is accordingly supported by the coupling portion. Moreover, due to the peripheral wall being supported by the coupling portion, the peripheral wall and the opposing face are separated from each other by an opening that extends around the entire periphery of the peripheral wall. This thereby enables the crushed portions of the energy absorption body to escape into the interior of the peripheral wall around the entire periphery of the energy absorption body. This thereby enables even more stable energy absorption characteristics to be obtained.

As explained above, the vehicular energy absorption structure according to the first aspect enables even more stable energy absorption characteristics to be obtained in a vehicular energy absorption structure provided with a guide section at the interior of a tube shaped energy absorption body made from a fiber reinforced resin.

BRIEF DESCRIPTION OF DRAWINGS

FIG. 3A is a cross-section illustrating a state sectioned along a vertical plane orthogonal to a vehicle width direction, and FIG. 3B is a cross-section illustrating a state sectioned along a horizontal plane orthogonal to a vehicle up-down direction.

FIG. 5 is a perspective view illustrating a guide member according to a comparative example.

FIG. 7 is a perspective view illustrating a guide member according to a modified example of the first embodiment.

DESCRIPTION OF EMBODIMENTS

Explanation follows regarding a vehicle front section structure S having a vehicular energy absorption structure according to an exemplary embodiment, with reference to the drawings. Note that the arrows FR, the arrows UP, the arrows OUT, and the arrows W applied in each of the drawings respectively indicate a front direction (direction of vehicle progression), an up direction, outside in a vehicle width direction, and a vehicle width direction, of a vehicle. Unless stated otherwise, reference in the following simply to front or rear, left or right, or up or down directions indicates front or rear in a vehicle front-rear direction, left or right in a vehicle left-right direction (vehicle width direction), or up or down in a vehicle up-down direction.

Overall Configuration

Figure 1:
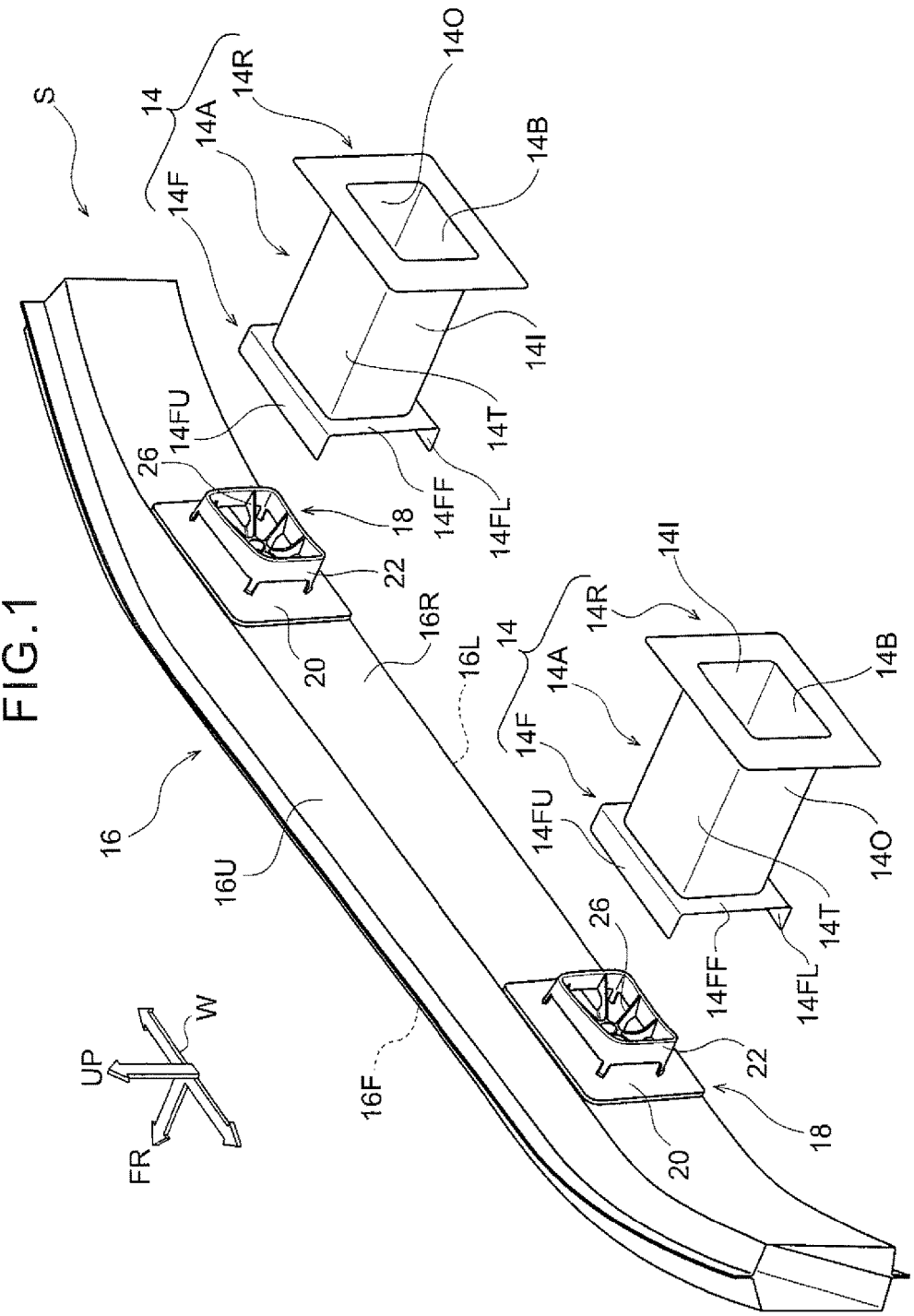
FIG. 1 is an exploded perspective view illustrating an overall configuration of a vehicle front section structure having a vehicular energy absorption structure of an exemplary embodiment, in a dismantled state of bumper reinforcement and crash boxes.

FIG. 1 is an exploded perspective view illustrating an overall configuration of a vehicle front section structure S. As illustrated therein, the vehicle front section structure S includes a bumper reinforcement 16 that is present in the vehicle front end section and extends along a vehicle width direction. A pair of left and right guide members 18 are respectively joined to rear faces 16R at a vehicle rear side of the bumper reinforcement 16. A pair of left and right crash boxes 14 are respectively joined to portions at the vehicle rear side of the bumper reinforcement 16 corresponding to the guide members 18. Moreover, at the rear of the left and right pair of crash boxes 14, front side members (not illustrated in the drawings), which are framework members having their length direction along the vehicle front-rear direction, are coaxially jointed to the crash boxes 14.

Bumper Reinforcement

The bumper reinforcement 16 has a closed cross-section structure (a hollow structure) formed with a substantially rectangular shape in cross-section orthogonal to the length direction, and includes an upper face 16U facing upward, a lower face 16L facing downward, a rear face 16R facing rearward, and a front face 16F facing forward.

Crash Box

Figure 3A:
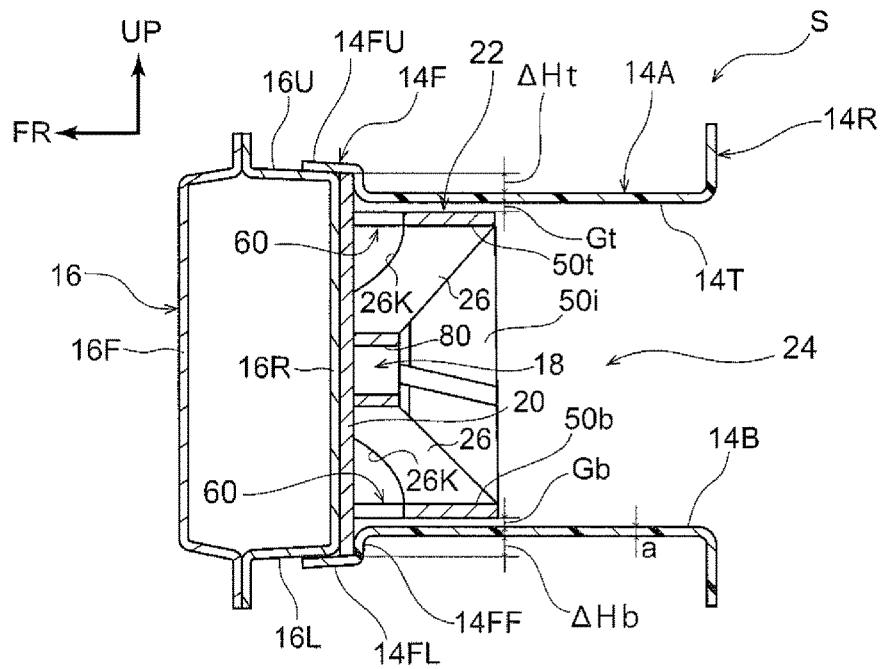
FIGS. 3A and 3B are cross-sections of a vehicle front section structure of an exemplary embodiment.
Figure 3B:
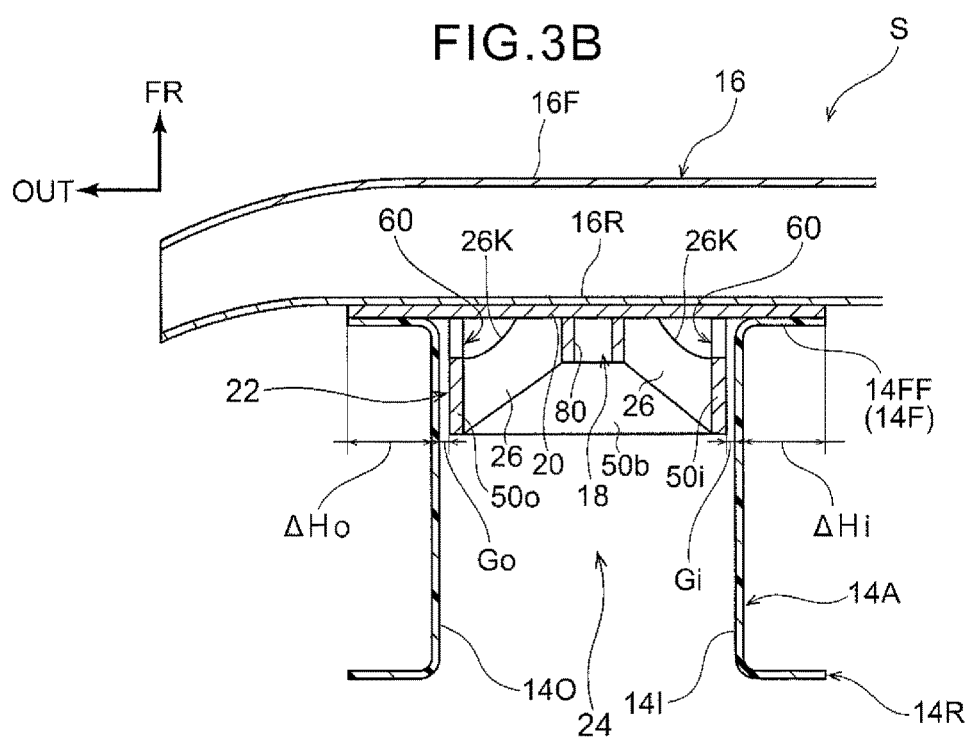

The crash boxes 14 are joined to the bumper reinforcement 16 at the vehicle rear side (see FIGS. 3A and 3B). The crash boxes 14 are provided parallel to each other as a left and right pair.

The crash boxes 14 are configured from fiber reinforced resin. The crash boxes 14 are each configured including a tube shaped energy absorption body 14A, a front flange 14F provided as a joint portion to a front end of the energy absorption body 14A, and a rear flange 14R provided to a rear end of the energy absorption body 14A.

The energy absorption body 14A has a tube shape (closed cross-section structure) of substantially rectangular cross-section, including a top side wall 14T facing upward, a bottom side wall 14B facing downward, an inside wall 14I facing toward a vehicle width direction inside, and an outside wall 14O facing toward a vehicle width direction outside.

The front flange 14F is formed extending from a front end of the energy absorption body 14A along an up-down direction, and is joined to the bumper reinforcement 16, in a state in which the upper face 16U and the lower face 16L of the bumper reinforcement 16 are held therein. Adhesive, welding, riveting or the like may, for example, be employed for such joining. More specifically, the front flange 14F includes a front wall 14FF that juts out from the front end of the energy absorption body 14A toward the top and bottom and left and right, an upper wall 14FU that extends out forward from an upper end of the front wall 14FF, and a lower wall 14FL that extends out forward from a lower end of the front wall 14FF.

As illustrated in FIGS. 3A and 3B, the front wall 14FF of the front flange 14F, and the front end of the energy absorption body 14A, together abut an attachment plate 20 of each of the guide members 18, described later. In this state, the upper wall 14FU and the lower wall 14FL are respectively joined to the upper face 16U and the lower face 16L of the bumper reinforcement 16. Due to the above, the front flange 14F serving as a joint portion is respectively joined to both upper and lower direction ends of the bumper reinforcement 16. Adhesive, welding, riveting or the like may, for example, be employed in such a joining state. At the front wall 14FF, the front wall 14FF is fastened together with the attachment plate 20 of each of the guide members 18, and the rear face 16R of the bumper reinforcement 16.

Guide Member

The vehicle front section structure S includes the guide members 18, each serving as a "guide section" and configured including a peripheral wall 22 and ribs 26. The guide members 18 are each configured including the attachment plate 20 joined to the rear face 16R of the bumper reinforcement 16, and the peripheral wall 22 and the ribs 26 formed projecting out from the attachment plate 20. Namely, the peripheral wall 22 and the ribs 26 of each of the guide members 18 project out from the attachment plate 20 toward the rear. As illustrated in FIGS. 3A and 3B, the peripheral wall 22 and the ribs 26 of each of the guide members 18 fit into an interior 24 of the energy absorption body 14A having a closed cross-section structure.

Each of the guide members 18 is configured to suppress positional misalignment of the energy absorption body 14A with respect to the attachment plate 20 and the bumper reinforcement 16, when joining of the energy absorption body 14A to the bumper reinforcement 16 and the attachment plate 20, through the front flange 14F, has been released (separated). In other words, each of the guide members 18 is a guide member that guides each front-rear direction portion of the energy absorption body 14A toward an appropriate location on the attachment plate 20 and the bumper reinforcement 16 as the energy absorption body 14A is being broken under compression from the front.

Figure 2:
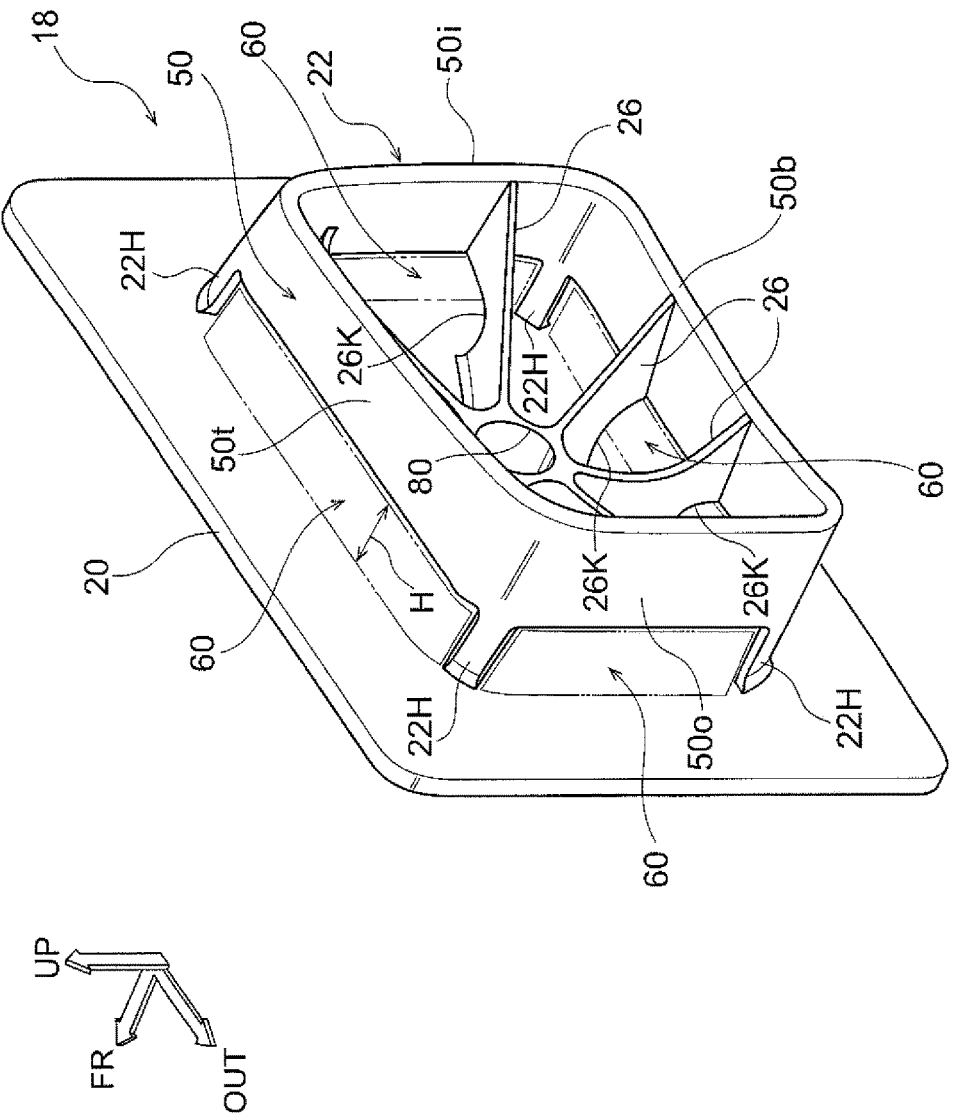
FIG. 2 is a perspective view of the guide member on the left side in FIG. 1, as viewed from diagonally behind and above a vehicle.

More specifically, as illustrated in FIG. 2, the guide members 18 are each configured including, as main parts thereof, the attachment plate 20 that is joined in a superimposed state to the rear face 16R of the bumper reinforcement 16, the peripheral wall 22 that projects out from the attachment plate 20 toward the vehicle rear side, and plural ribs 26 that are formed in a shape radiating out from a center of the attachment plate 20 and that reinforce the attachment plate 20 and the peripheral wall 22.

The attachment plate 20 is configured in a substantially rectangular plate shape. As illustrated in FIG. 3A, the upper end of the attachment plate 20 is substantially aligned with the upper end of the rear face 16R of the bumper reinforcement 16, and the lower end of the attachment plate 20 is substantially aligned with the lower end of the rear face 16R of the bumper reinforcement 16. In a state in which each of the crash boxes 14 is joined to the bumper reinforcement 16, the two up-down direction ends of the energy absorption body 14A are positioned between the two up-down direction ends of the attachment plate 20. More specifically, the upper end of the attachment plate 20 is positioned by an amount $\Delta Ht$ further toward the vehicle top than the top side wall 14T of the energy absorption body 14A, and the lower end of the attachment plate 20 is positioned by an amount $\Delta Hb$ further toward the vehicle bottom than the bottom side wall 14B of the energy absorption body 14A.

As illustrated in FIG. 3B, in a state in which each of the crash boxes 14 is joined to the bumper reinforcement 16, the two left-right direction ends of the energy absorption body 14A are positioned between the two left-right direction ends of the attachment plate 20. More specifically, a vehicle width direction outside end of the attachment plate 20 is positioned by an amount $\Delta Ho$ further toward the vehicle width direction outside than the outside wall 14O of the energy absorption body 14A, and the vehicle width direction inside end of the attachment plate 20 is positioned by an amount $\Delta Hi$ further toward the vehicle width direction inside than the inside wall 14I of the energy absorption body 14A.

Peripheral Wall

The peripheral wall 22 is provided projecting out from the attachment plate 20 toward the vehicle rear side and, as illustrated in FIG. 2, is formed with a peripheral shape so as to surround a central portion of the attachment plate 20 from the periphery. The peripheral wall 22 is also shaped so as to be housed in the interior 24 of the rectangular tube shaped energy absorption body 14A and formed in a substantially rectangular shape as viewed from a direction perpendicular to the attachment plate 20.

Gap

Next, explanation follows regarding a gap from each of the walls configuring the energy absorption body 14A (the top side wall 14T, the bottom side wall 14B, the inside wall 14I, and the outside wall 14O), to the peripheral wall 22. The gaps referred to here are gaps measured in a direction perpendicular to each of the walls of the energy absorption body 14A.

In the following explanation, as illustrated in FIG. 3A and FIG. 3B, the gap from each of the walls configuring the energy absorption body 14A (the top side wall 14T, the bottom side wall 14B, the outside wall 14O, and the inside wall 14I) to the peripheral wall 22 facing each of the walls is respectively referred to as gap Gt, gap Gb, gap Go, and gap Gi. The gap Gt corresponds to the top side wall 14T, the gap Gb corresponds to the bottom side wall 14B, the gap Go corresponds to the outside wall 14O, and the gap Gi corresponds to the inside wall 14I. The gap Gt, the gap Gb, the gap Go, and the gap Gi are sometimes referred to collectively as gaps G.

Abutting Wall Serving as Abutting Section

The peripheral wall 22 is provided so as to be in proximity to each of the walls of the energy absorption body 14A, with a narrow gap G between them.

More specifically, as illustrated in FIG. 3A, the gap Gt is set so as to be smaller than the offset amount $\Delta Hb$ (Gt<$\Delta Hb$). Thus even if the top side wall 14T was to move downward by an amount of gap Gt, a state is maintained in which the bottom side wall 14B and the attachment plate 20 face each other along the front-rear direction. Moreover, the gap Gb is set smaller than the offset amount ΔHt (Gb<ΔHt). Thus even if the bottom side wall 14B was to move upward by an amount of gap Gb, a state is maintained in which the top side wall 14T and the attachment plate 20 face each other along the front-rear direction.

Moreover, as illustrated in FIG. 3B, the gap Go is set so as to be smaller than the offset amount ΔHi (Go<ΔHi). Thus even if the outside wall 14O was to move toward the vehicle inside by an amount of gap Go, a state is maintained in which the inside wall 14I and the attachment plate 20 face each other along the vehicle front-rear direction. Moreover, the gap Gi is set smaller than the offset amount ΔHo (Gi<ΔHo). Thus even if the inside wall 14I was to move toward the vehicle outside by an amount of gap Gi, a state is maintained in which the outside wall 14O and the attachment plate 20 face each other along the vehicle front-rear direction.

In the present exemplary embodiment, the gaps Gt, Gb, Go, Gi are set to be about 2 mm. The peripheral wall 22 corresponds to the "abutting section" referenced herein. In the following, the portion of the peripheral wall 22 that is in proximity to the top side wall 14T of the energy absorption body 14A is referred to as a top side abutting wall 50t, the portion thereof that is in proximity to the bottom side wall 14B is referred to as a bottom side abutting wall 50b, the portion thereof that is in proximity to the inside wall 14I is referred to as an inside abutting wall 50i, and the portion thereof that is in proximity to the outside wall 14O is referred to as an outside abutting wall 50o. These are all sometimes simply referred to collectively as an abutting wall 50.

Escape Hole

Escape holes 60 are formed in the peripheral wall 22. There are a total of four of the escape holes 60 formed, with each respectively formed in the top side abutting wall 50t, the bottom side abutting wall 50b, the inside abutting wall 50i, and the outside abutting wall 50o. The positions of the escape holes 60 are at the base of the peripheral wall 22, namely portions further to the attachment plate 20 side than the abutting wall 50. The escape holes 60 are formed so as to leave remaining the boundary portion between the top side abutting wall 50t and the inside abutting wall 50i, the boundary portion between the inside abutting wall 50i and the bottom side abutting wall 50b, the boundary portion between the bottom side abutting wall 50b and the outside abutting wall 50o, and the boundary portion between the outside abutting wall 50o and the top abutting wall 50t. The remaining portions thereof configure pillars 22H that support the peripheral wall 22.

In the configuration described above, the inside and the outside of the peripheral wall 22 are configured so as to be in communication with each other at each of the portions on the attachment plate 20 side of the top side abutting wall 50t, the bottom side abutting wall 50b, the inside abutting wall 50i, and the outside abutting wall 50o. In other words, the escape holes 60 are formed as openings communicating the space on the side of the abutting wall 50 that is the side of the walls configuring the energy absorption body 14A, with the space on the side of the abutting wall 50 that is the opposite side to the side of the walls configuring the energy absorption body 14A.

A dimension H of the escape holes 60 in the axial direction of the energy absorption body 14A (a dimension in the vehicle front-rear direction in the present exemplary embodiment) is at least a thickness a of a wall configuring the energy absorption body 14A or greater (see FIG. 3A), and is preferably three times the thickness a of the wall configuring the energy absorption body 14A or greater.

Ribs

A plurality of the ribs 26 are provided as "coupling portions" at the opposite side of the abutting wall 50 to the wall configuring the energy absorption body 14A (namely, at the inside of the peripheral wall 22), so as to project out from the attachment plate 20 toward the vehicle rear direction side. The plural ribs 26 are formed in a shape radiating out from a central portion of the attachment plate 20 (from a central portion at the inside of the peripheral wall 22). The leading end portion of each of the ribs 26 is coupled to the peripheral wall 22. The attachment plate 20 and the peripheral wall 22 are thereby coupled together by the plural ribs 26. The abutting wall 50 can accordingly be said to be supported by the plural ribs 26 and the pillars 22H.

A tow hook fixing 80 formed with a female thread for screwing together with a male thread of a tow hook, not illustrated in the drawings, is configured at a base end side of the plural ribs 26 (a central portion at the inside of the peripheral wall 22) (note that the hole for insertion of the tow hook is omitted from illustration in each of the drawings). A large load is input to the attachment plate 20 from the tow hook. The plural ribs 26 have a function of raising the surface rigidity of the attachment plate 20.

Each of the ribs 26 is formed in a shape as if cut out from a plate shaped member having its plate thickness direction along the circumferential direction of the peripheral wall 22. Namely, the plate shaped ribs 26 are coupled to the attachment plate 20, and are also coupled to the peripheral wall 22. Cutouts 26K are formed in the radiating shaped ribs 26 at the peripheral wall 22 side (leading end side), and at end portions thereof on the attachment plate 20 side (portions corresponding to the escape holes 60), as viewed from a vehicle side face. Thus the ribs 26 include the cutouts 26K as "escape portions" such that crushed portions 90 of the energy absorption body 14A are not impeded from entering inside the peripheral wall 22. Moreover, in the present exemplary embodiment, the cutouts 26K are formed in a substantially circular arc shape, such that the force to support the peripheral wall 22 by the ribs 26 is not impaired.

Operation and Advantageous Effects

Next, explanation follows regarding operation and advantageous effects of the vehicle front section structure S of the present exemplary embodiment.

In the vehicle front section structure S of the exemplary embodiment, the front ends of each of the tube shaped energy absorption bodies 14A made from fiber reinforced resin abut the attachment plates 20 of the guide members 18 that are joined to the rear face 16R of the bumper reinforcement 16. Namely, the vehicle front section structure S includes the tube shaped energy absorption bodies 14A made from fiber reinforced resin, and the attachment plates 20 provided as "opposing faces" facing an axial direction end portion of the energy absorption body 14A. Then, during a vehicle collision, the attachment plate 20 crushes the energy absorption body 14A from the axial direction end portion (the vehicle front direction end portion) (see FIG. 4B). Collision energy is thereby absorbed.

Moreover, the vehicle front section structure S includes the peripheral wall 22 and the ribs 26 that project out from the attachment plate 20 and are disposed as a "guide section" at the interior 24 of the energy absorption body 14A.

The peripheral wall 22 is configured including the abutting wall 50 as an "abutting section". The abutting wall 50 is provided so as to be capable of contacting walls (the top side wall 14T, the bottom side wall 14B, the outside wall 14O, and the inside wall 14I) configuring the energy absorption body 14A from the inner side during a vehicle collision. Positional misalignment of the energy absorption body 14A with respect to the attachment plate 20 (and with respect to the bumper reinforcement 16 to which the attachment plate 20 is joined) is accordingly suppressed from occurring during a vehicle collision.

Figure 4A:
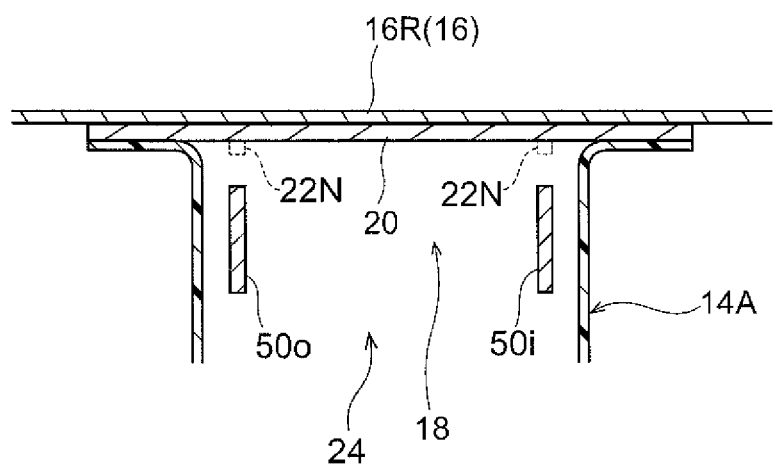
FIGS. 4A and 4B are diagrams illustrating a manner in which an energy absorption body crushes during a vehicle collision in a vehicle front section structure according to an exemplary embodiment.
Figure 4B:
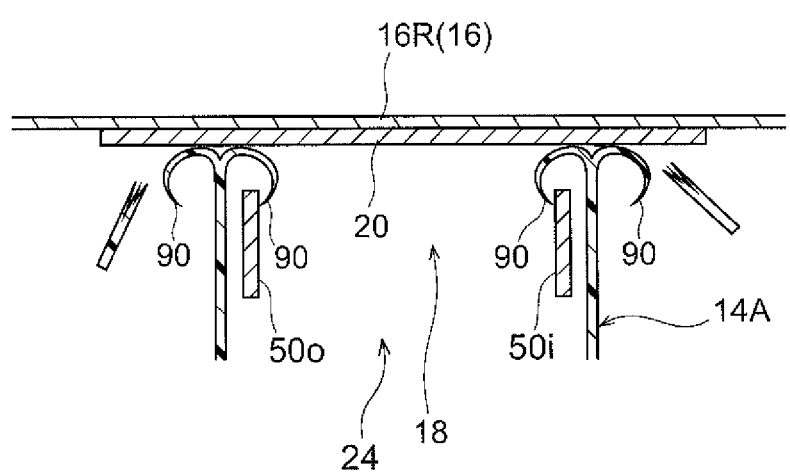

Moreover, the escape holes 60 are formed at the end portions of the peripheral wall 22 on the attachment plate 20 side, and the part of the peripheral wall 22 further to the vehicle rear side than the escape holes 60 (on the opposite side to the attachment plate 20) configures the abutting wall 50. Namely, the abutting wall 50 is provided spaced away from the attachment plate 20 by an opening in the axial direction of the energy absorption body 14A (see FIG. 4A). The opening is configured by respective openings (the escape holes 60) communicating the space on the side of the abutting wall 50 that is the side of the walls configuring the energy absorption body 14A, with the space on the side of the abutting wall 50 that is the opposite side to the side of the walls configuring the energy absorption body 14A. Thus, during a vehicle collision, as illustrated in FIG. 4B, the crushed portions 90 that have entered into the interior 24 of the energy absorption body 14A are able to escape through these openings (the escape holes 60), to the space on the opposite side of the abutting wall 50 to the side of the walls configuring the energy absorption body 14A (to the center side of the energy absorption body 14A, the inside of the peripheral wall 22). The crushed portions 90 are thereby suppressed from getting jammed between the abutting wall 50 and the portions of the walls configuring the energy absorption body 14A that have not yet been crushed.

Figure 6A:
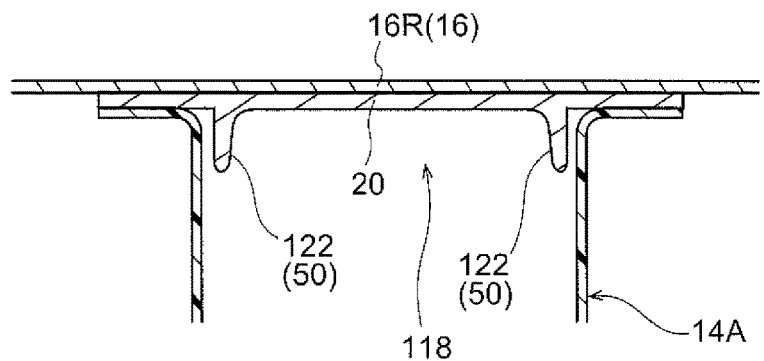
FIGS. 6A, 6B, and 6C are diagrams illustrating a manner in which an energy absorption body crushes in a vehicle front section structure provided with a guide member according to the comparative example.
Figure 6B:
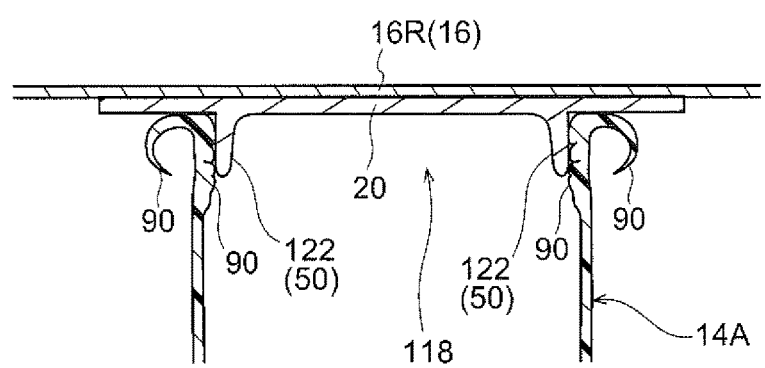

A more detailed explanation is that, as illustrated in FIG. 4B and FIG. 6B, the crushed portions 90 are generated in the vicinity of the attachment plate 20, this being at the axial direction end portion of the energy absorption body 14A, when the energy absorption body 14A is being crushed from the axial direction end section during a vehicle collision. Part of the crushed portions 90 then enters the interior 24 of the energy absorption body 14A (inside a closed cross-section).

Figure 6C:
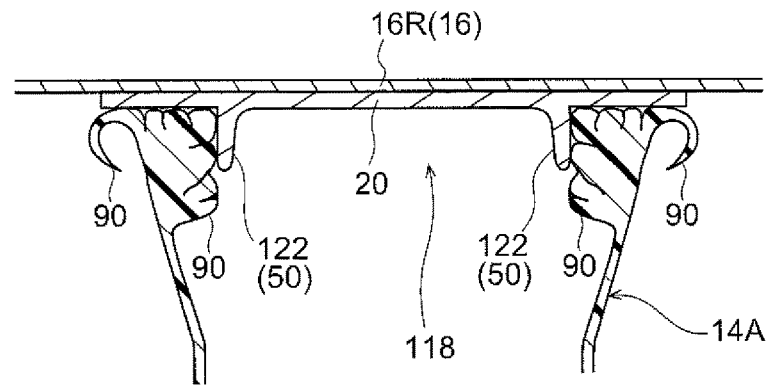

Explanation first follows regarding a guide member 118 in the comparative example illustrated in FIG. 5. The guide member 118 is not formed with an escape hole in a peripheral wall 122. Namely, as illustrated in FIG. 6A, an opening in the axial direction of the energy absorption body 14A is not formed between the abutting walls 50 and the attachment plate 20. Thus, as illustrated in FIG. 6B, the crushed portions 90 entering the interior of the energy absorption body 14A get jammed between the peripheral wall 122 and each of the walls of the energy absorption body 14A. The energy absorption body 14A receives load from the jammed crushed portions 90 in a direction orthogonal to the axial direction of the energy absorption body 14A (the front-rear direction), and, as illustrated in FIG. 6C, this leads to a concern that folding might occur at a part of the energy absorption body 14A partway along the axial direction. If the energy absorption body 14A folds at a portion partway along the axial direction, progressive deformation is impeded, with a reduction in the amount of energy absorption.

In contrast thereto, in the vehicle front section structure S of the present exemplary embodiment, the abutting wall 50 is provided spaced away from the attachment plate 20 by an opening (the escape hole 60) in the axial direction of the energy absorption body 14A. As illustrated in FIG. 4B, due to the crushed portions 90 passing through this opening, the crushed portions 90 are suppressed from becoming jammed between the abutting wall 50 and the portions of the walls configuring the energy absorption body 14A that have not yet been crushed. As a result, the energy absorption body 14A is suppressed from receiving load from the crushed portions 90 in a direction orthogonal to the axial direction of the energy absorption body 14A, enabling stable energy absorption properties to be obtained.

In the vehicle front section structure S of the present exemplary embodiment, the "abutting section" that contacts each of the walls of the energy absorption body 14A during a vehicle collision is configured by the abutting wall 50 provided substantially parallel to each of these walls. A large load is thereby suppressed from being locally input to the walls configuring the energy absorption body 14A. The energy absorption body 14A is thereby suppressed from breaking due to contact with the abutting wall 50.

Moreover, in the vehicle front section structure S of the present exemplary embodiment, the guide members 18 includes the plural ribs 26. Namely, the "guide section" is configured including the ribs 26 serving as "coupling portions" coupling the abutting wall 50 and the attachment plate 20 together. The abutting wall 50 can thereby be supported by the ribs 26, and this thereby facilitates forming a larger opening (the escape holes 60) between the abutting wall 50 and the attachment plate 20. Moreover, the ribs 26 are disposed on the opposite side of the abutting wall 50 to the walls configuring the energy absorption body 14A. This thereby suppresses the crushed portions 90 from getting jammed between the ribs 26 and the walls configuring the energy absorption body 14A.

Moreover, in the vehicle front section structure S of the present exemplary embodiment, the cutouts 26K are formed in the ribs 26, and the ribs 26 include the cutouts 26K serving as "escape portions" such that the crushed portions 90 of the energy absorption body 14A are not impeded from entering the interior of the peripheral wall 22. The crushed portions 90 are thereby suppressed even further from getting jammed between the abutting wall 50 and the ribs 26, and the walls configuring the energy absorption body 14A.

In the vehicle front section structure S of the present exemplary embodiment, the abutting wall 50 (the top side abutting wall 50t, the bottom side abutting wall 50b, the inside abutting wall 50i, and the outside abutting wall 50o) formed with the escape holes 60 is formed for each of the walls (the top side wall 14T, the bottom side wall 14B, the inside wall 14I, and the outside wall 14O) configuring the tube shaped energy absorption body 14A having a substantially rectangular shaped cross-section. Namely, the abutting wall 50 configures the peripheral wall 22 that is provided so as to correspond with the entire periphery of the walls configuring the energy absorption body 14A. Positional misalignment between the energy absorption body 14A and the attachment plate 20 (the bumper reinforcement 16) is thereby appropriately suppressed in all directions from the vehicle up-down directions and the vehicle width directions. Moreover, load from the crushed portions 90 is suppressed from being input to each of the walls configuring the energy absorption body 14A.

Modified Examples

In the present exemplary embodiment, explanation has been given regarding the guide members 18 configured including the pillars 22H; however, the embodiments are not limited thereto. For example, the configuration of a modified example may be adopted, such as that illustrated in FIG. 7. Note that this diagram is a perspective view of a guide member, as viewed from diagonally to the rear and above a vehicle, and is a diagram corresponding to FIG. 2 of the above exemplary embodiment.

A guide member 38 according to the modified example illustrated in FIG. 7 differs from the guide members 18 of the above exemplary embodiment in that the pillars 22H are not provided. Namely, the peripheral wall 22 is provided with an opening to the attachment plate 20 around the entire periphery. Thus the peripheral wall 22 is supported by plural ribs 26 alone. Other parts of the configuration are substantially the same as those of the guide members 18 of the above exemplary embodiment.

Next, explanation follows of the operation and advantageous effects of the above modified example, regarding parts that differ from the above exemplary embodiment.

In the above modified example, the peripheral wall 22 is supported by the ribs 26 alone, and there are no pillars 22H provided in the guide section. Namely, the peripheral wall 22 serving as the abutting section is supported by the ribs 26 alone, and the abutting wall 50 (the peripheral wall 22) and the attachment plate 20 are provided spaced away from each other by an opening (escape hole 60) around the entire periphery of the peripheral wall 22. Any concern that the crushed portions 90 might get jammed between pillars 22H and the walls configuring the energy absorption body 14A is thereby eliminated, enabling even more stable energy absorption characteristics to be obtained.

Supplementary Explanation of the Above Exemplary Embodiments

In the above exemplary embodiments, the energy absorption bodies 14A are configured with a substantially rectangular shaped cross-section tubular shape (closed cross-section structure); however, the embodiments are not limited thereto. Any shape may be employed for the energy absorption bodies as long as it is a tubular shape (closed cross-section structure). Moreover, although in the above exemplary embodiments the energy absorption bodies 14A are joined to the bumper reinforcement 16 through the front flange 14F, there are no particular limitations to the manner by which the energy absorption body 14A is joined to the bumper reinforcement 16. Moreover, although in the above exemplary embodiments the vehicular energy absorption structure is applied to a vehicle front section structure equipped with the (front) bumper reinforcement 16 serving as bumper reinforcement, the embodiments are not limited thereto, and application may be made to a vehicle rear section structure equipped with rear bumper reinforcement provided extending along the vehicle width direction of a vehicle rear end portion.

Moreover, although in the above exemplary embodiments the front end of the energy absorption body 14A abuts the attachment plate 20 of the guide members 18, the embodiments are not limited thereto. For example, a configuration may be adopted in which the attachment plate 20 of the guide members 18 is formed smaller, and the front end of the energy absorption body 14A abuts the rear face 16R of the bumper reinforcement 16. Namely, a configuration may be adopted in which the attachment plate 20 of the guide members 18 is not interposed between the energy absorption body 14A and the bumper reinforcement 16. In such cases the rear face 16R of the bumper reinforcement 16 corresponds to the "opposing face" referenced herein. Moreover, the offset amounts ΔHt, ΔHb, ΔHo, ΔHi explained in the above exemplary embodiment may be considered not as offset amounts to the attachment plate 20, but rather as offset amounts to the rear face 16R of the bumper reinforcement 16.

Moreover, in the above exemplary embodiment, the gaps Gt, Gb, Go, Gi are set at about 2 mm; however, the embodiments are not limited thereto. In cases in which joining of the energy absorption body to the bumper reinforcement is released (separated) during a vehicle collision, it is sufficient that the abutting section is configured to internally contact the walls configuring the energy absorption body and suppress positional misalignment of the energy absorption body 14A with respect to the bumper reinforcement 16.

In the above exemplary embodiment, the guide members 18 are configured including the ribs 26 serving as "coupling portions"; however, the embodiments are not limited thereto. For example, the guide member may be configured omitting the ribs 26, with the abutting wall 50 supported by the pillars 22H alone.

In the present exemplary embodiment, the peripheral wall 22 serving as the "abutting section" or the "abutting wall" is formed with a peripheral shape so as to surround a central portion of the attachment plate 20 from the periphery; however, the embodiments are not limited thereto. For example, the guide member may be formed with the inside abutting wall 50i and the outside abutting wall 50o corresponding to the inside wall 14I and the outside wall 14O of the energy absorption body 14A, without forming the top side abutting wall 50t and the bottom side abutting wall 50b. Moreover, the guide member may be formed with the inside abutting wall 50i alone, without forming the other parts of the abutting wall 50.

In the above exemplary embodiment, respective escape holes 60 are formed in the top side abutting wall 50t, the bottom side abutting wall 50b, the inside abutting wall 50i, and the outside abutting wall 50o of the peripheral wall 22; however, the embodiments are not limited thereto. For example, there can be embodiments in which the escape hole 60 is only formed in the inside abutting wall 50i. In such cases, the inside abutting wall 50i alone corresponds to the "abutting section" or the "abutting wall" of the present invention.

In the above exemplary embodiments, the position of the escape holes 60 is at the foot of the peripheral wall 22, namely, in end portions of the abutting wall 50 on the attachment plate 20 side; however, the embodiments are not limited thereto. It is sufficient that an opening is formed between the opposing face and the abutting section, and, for example, escape holes 60 (openings) may be formed such that a small portion at the foot of the peripheral wall 22 (indicated by dashed lines at 22N in FIG. 4A) remains.

In the present exemplary embodiment, the bumper reinforcement 16 and the guide members 18 are configured by separate members, and the two members are joined together; however, the embodiments are not limited thereto. For example, bumper reinforcement and guide members may be integrally molded.

What is claimed is:
1. A vehicular energy absorption structure comprising:
   a hollow tubular energy absorption body made from a fiber reinforced resin the hollow tubular energy absorption body having a longitudinal axis that extends in an axial direction;
   an opposing face that is provided facing an axial direction end portion of the energy absorption body, and against which the energy absorption body is crushed from the axial direction end portion during a vehicle collision; and a guide section that projects from the opposing face and that is disposed at an interior of the energy absorption body, the guide section comprising:
   a peripheral wall that extends in the axial direction and contacts a wall of the energy absorption body from an inner side of the wall of the energy absorption body during the vehicle collision, the peripheral wall being substantially parallel to the wall of the energy absorption body and being disposed adjacent to an entire periphery of the wall of the energy absorption body, and
   a coupling disposed at an interior of the peripheral wall and coupling the peripheral wall to the opposing face, wherein
   the peripheral wall is attached to the opposing face only by the coupling so that an entire axial direction end of the peripheral wall that opposes and is located adjacent to the opposing face does not contact the opposing face and is separated from the opposing face in the axial direction by an opening that extends in the axial direction between the opposing face and the entire axial direction end of the peripheral wall around an entire periphery of the peripheral wall.

2. The energy absorption structure of claim 1, wherein the coupling comprises a plurality of ribs attached between the opposing face and an inner side of the peripheral wall.

\* \* \* \* \*